(12) United States Patent  (10) Patent No.: US 9,053,641 B2
Samosky  (45) Date of Patent: Jun. 9, 2015

(54) REAL-TIME X-RAY VISION FOR HEALTHCARE SIMULATION

(75) Inventor: Joseph T. Samosky, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 86 days.

(21) Appl. No.: 13/376,410

(22) PCT Filed: Jun. 10, 2010

(86) PCT No.: PCT/US2010/038112
§ 371 (c)(1),
(2), (4) Date: Mar. 2, 2012

(87) PCT Pub. No.: WO2010/144663
PCT Pub. Date: Dec. 16, 2010

(65) Prior Publication Data
US 2012/0156665 A1  Jun. 21, 2012

Related U.S. Application Data

(60) Provisional application No. 61/186,080, filed on Jun. 11, 2009.

(51) Int. Cl.
*G09B 23/28*  (2006.01)
*G09B 23/30*  (2006.01)

(52) U.S. Cl.
CPC .............. *G09B 23/30* (2013.01); *G09B 23/285* (2013.01)

(58) Field of Classification Search
CPC ...... G09B 23/28; G09B 23/285; G09B 23/30; G09B 5/02
USPC .................................................. 434/262–275
See application file for complete search history.

(56) References Cited

U.S. PATENT DOCUMENTS

| | | | |
|---|---|---|---|
| 4,484,896 A | 11/1984 | Kohnke | |
| 4,907,973 A | 3/1990 | Hon | |
| 6,028,593 A | 2/2000 | Rosenberg et al. | |
| 6,544,041 B1* | 4/2003 | Damadian | 434/262 |
| 6,857,878 B1 | 2/2005 | Chosack et al. | |
| 6,929,481 B1 | 8/2005 | Alexander et al. | |
| 8,162,668 B2* | 4/2012 | Toly | 434/267 |
| 2004/0009459 A1* | 1/2004 | Anderson et al. | 434/262 |
| 2006/0046235 A1 | 3/2006 | Alexander et al. | |
| 2006/0183096 A1* | 8/2006 | Riener et al. | 434/276 |
| 2008/0113324 A1 | 5/2008 | Ishii et al. | |
| 2010/0159434 A1 | 6/2010 | Lampotang et al. | |

FOREIGN PATENT DOCUMENTS

JP  2008250349 A  10/2008

OTHER PUBLICATIONS

The International Bureau of WIPO, "International Preliminary Report on Patentability", Dec. 22, 2011, 2 pp.
Korean Intellectual Property Office, "Written Opinion of the International Searching Authority", Feb. 8, 2011, 4 pp.

* cited by examiner

*Primary Examiner* — Timothy A Musselman
(74) *Attorney, Agent, or Firm* — Eckert Seamans Cherin & Mellott, LLC; Stephen A. Bucchianeri

(57) ABSTRACT

A medical procedure training system and method for using is provided. The system includes a sensing system structured to detect the position and motion of a medical device inserted into a simulated body, a processor structured to generate images of the medical device and relevant anatomical structures based on the detected position and motion of the medical device, and a display system structured to display the images in a correct registration on the outer surface of the simulated body.

15 Claims, 3 Drawing Sheets

REAL-TIME X-RAY VISION FOR HEALTHCARE SIMULATION

CROSS-REFERENCE TO RELATED APPLICATION

This application claims priority under 35 U.S.C. §119(e) from U.S. Provisional Application No. 61/186,080, entitled "Real-Time "X-Ray Vision" for Healthcare Simulation: An Interactive Projective Overlay System to Enhance Intubation Training and Other Procedural Training", which was filed on Jun. 11, 2009, the disclosure of which is incorporated herein by reference.

FIELD OF THE INVENTION

The present invention relates to medical training tools, and in particular to systems and methods for training medical procedures.

BACKGROUND OF THE INVENTION

Endotracheal intubation is a high-risk and high-consequence medical procedure which involves the placement of a flexible plastic tube into the trachea of a patient to protect the airway while providing mechanical ventilation. The procedure is performed by a wide range of health care providers in cases of emergency respiratory arrest and many surgeries. Since 1987, more than one million malpractice suits were settled related to difficult airway management. The cost to health care providers of litigation, additional procedures required as a result of complications and the cost of airway management training are staggering. Complications surrounding airway management and endotracheal intubation require new and innovative educational techniques to better train health care providers on proper techniques and decrease the cost to health care providers.

A major provider of intubation simulation devices used in training is Laerdal Medical Corporation of Wappingers Falls, N.Y. Laerdal has pioneered several upper-respiratory intubation trainers such as VitalSim® and SimMan® for use by health care providers ranging from nursing students to board certified clinicians. SimMan® is presently their most sophisticated and advanced training device. SimMan® is a portable and advanced patient simulator for team training that has realistic anatomy and clinical functionality that allows students to practice emergency treatment of patients through simulation-based education that is designed to challenge and test students' clinical and decision-making skills during realistic patient care scenarios. SimMan® is representative of a patient simulator capable of providing feedback of the care administered specific to the medical condition.

A basic but significant limitation of training medical procedures on real patients or such patient simulators is that bodies are (mostly) opaque. For many procedures (e.g., without limitation, endotracheal tube insertion, Foley catheter placement, bronchoscopy, central line placement) it would be advantageous if patients were "see through" so that a trainee could see what was actually occurring within the body as the trainee manipulated a tool or device. Presently, systems exist that project simulations of internal structures onto a body, however such systems do not allow for interaction by a trainee and do not provide any type of feedback as to foreign structures, such as medical instruments, placed into a body. An example of such a system is the Virtual Anatomical Model developed in the Virtual Systems Laboratory of Gifu University, in the city of Gifu, Gifu Prefecture, Japan. Such system projects computer generated images of anatomy onto a rigid white body form. The position and orientation of the form is tracked and the images are transformed appropriately so that it appears to users that they can rotate the body and see the internal anatomy from different orientations. Such system, while offering potential utility for the study of anatomy, does not provide for procedural simulation, i.e., it does not track the position of medical devices and display their internal representations in accurate relationship to internal structures, does not display displacements or other positional alterations of internal structures as they are contacted by medical devices and does not allow interaction with medical devices to be viewed internally. Such system also requires that the images be viewed through a small hand-held window frame which is tracked in order to correct for parallax errors. The use of such viewer window does not lend itself to group learning environments as accurate viewing is limited to a single person at a time.

As such, there exists a need for improved systems and methods for teaching medical procedures including, without limitation, those procedures that involve the external manipulation of a medical device that is moving or acting inside the body. There may be significant advantages to a system that during training enables the visualization of the internal portions of tools and devices and the relevant anatomy with which the tools interact. Such real-time, interactive visualizations may permit trainees to develop better mental models of the internal consequences of their external actions. These mental models may in turn help trainees to acquire skills more quickly and efficiently, achieve higher levels of proficiency, and help them more effectively to identify and avoid potential errors that could cause harm in an actual patient.

SUMMARY OF THE INVENTION

In one non-limiting embodiment, the invention provides a medical procedure training method comprising: sensing a position and motion of a medical device inserted into a simulated body or portion thereof, generating visual images of both the medical device and relevant anatomical structures using the sensed position and motion of the medical device, and displaying the images in real-time in a correct registration on a surface of the simulated body.

Generating images of the medical device and relevant anatomical structures may comprise choosing and synchronizing pre-recorded video of the medical device and relevant anatomical structures. Generating images of the medical device and relevant anatomical structures may comprise electronically rendering a depiction of the medical device and relevant anatomical structures.

Displaying the images in a correct registration on a surface of the simulated body may comprise optically projecting the images onto the surface. Displaying the images in a correct registration on a surface of the simulated body may comprise displaying the images on a video display system disposed in or on the surface of the simulated body.

The medical procedure training method may further comprise providing a notification that the medical device has moved to a predetermined undesired location. Providing a notification that the medical device has moved to a predetermined undesired location may comprise providing at least one of a visual, audible, or tactile notification.

The medical procedure training method may further comprise: sensing additional variable physical states of the medical device in addition to position and motion, generating additional visual images of the additional variable physical states of the medical device, and displaying the additional visual images in real-time in a correct registration on a surface of the simulated body.

In another non-limiting embodiment, the invention provides a medical procedure training system comprising: at least a portion of a simulated body having a surface, a sensing system structured to detect the position and motion of a medical device inserted into the simulated body, a display system, and a processor structured to generate images of the medical device and relevant anatomical structures based on the detected position and motion of the medical device, the processor being structured to cause the display system to display the images in a correct registration on the surface of the simulated body.

The sensing system may be structured to detect the position and motion of a medical device inserted in a passage extending into and defined within the simulated body and the sensing system may comprise a number of sensors disposed along the passage. Each sensor of the number of sensors may comprises a Hall-effect sensor.

The display system may comprises a projector structured to project the images onto the surface of the simulated body. The display system may comprise a video display system disposed in or on the surface of the simulated body.

In a further non-limiting embodiment, the invention provides a training system for use with a simulated body. The system comprises: a sensing system structured to detect the position and motion of a medical device inserted into the simulated body, a processor structured to generate images of the medical device and relevant anatomical structures based on the detected position and motion of the medical device, and a display system structured to display the images in a correct registration on the outer surface of the simulated body.

The sensing system may be structured to be disposed within the simulated body. The sensing system may comprise an array of sensors structured to be disposed within the simulated body. Each sensor of the array of sensors may comprise a Hall-effect sensor. The sensing system may further comprise an adaptor that is structured to couple the array of sensors to an internal structure of the simulated body.

In yet another non-limiting embodiment, the invention provides a training system for use with a simulated body. The system comprises: a medical device, a sensing system structured to detect the position and motion of the medical device within the simulated body, a processor structured to generate images of the medical device and relevant anatomical structures based on the detected position and motion of the medical device, and a display system structured to display the images in a correct registration on the outer surface of the simulated body.

The medical device may comprise a magnet coupled thereto and the sensing system may comprises an array of Hall-effect sensors structured to be disposed along a passage within the simulated body for detecting position of the magnet therein.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

As employed herein, the statement that two or more parts or components are "coupled" together shall mean that the parts are joined or operate together either directly or through one or more intermediate parts or components.

As employed herein, the term "number" shall mean one or an integer greater than one (i.e., a plurality).

As employed herein, the term "simulated body" shall be used to refer to a simulated (i.e., artificial) human or animal body or a portion thereof.

As employed herein, the term "relevant anatomical structures" shall be used to refer to internal anatomical structures that would be present in a living human or animal body at or near a particular location identified in a corresponding simulated body.

The present invention provides improved systems and methods for training medical procedures. More particularly, the present invention provides training systems and methods that allow a student to see simulated images of the internal happenings of a simulated medical procedure displayed in real time on the body in which the procedure is being performed as the procedure occurs. The images are provided in a manner that allows the student, as well as others, to clearly view the images as if they possessed the power to see into and or through objects (i.e., x-ray vision) throughout the procedure. This enables students to better understand the internal consequences of their external manipulations and aids in the building of good mental models. The ability to provide feedback on performance in real-time (that is, perceptually indistinguishable from instantaneous or nearly so) also offers potential advantages to conventional medical training. For example, in conventional simulation training the common error of inserting an endotracheal intubation tube (ET tube) into the esophagus, rather than the trachea, may not be detected by either the instructor or trainee until the cuff of the ET tube has been inflated, the stylet withdrawn, the bag valve mask attached, and ventilation started. At that time, expansion of the simulator's stomach would signal incorrect ET tube placement, but by this time the critical task point, the moment when the tip of the ET tube was misdirected into the esophageal opening rather than between the vocal cords, has long since passed. With the present invention, the trainee can be alerted instantly if she or he places the ET tube into the esophagus via, for example, a visual or auditory alert and the display of a projected view of the ET tube in the esophagus rather than the trachea. This permits the trainee to immediately be aware of the source of their error and immediately take corrective action. Such immediate feedback on an error in either cognitive or psychomotor performance may permit more effective self-analysis and self-correction, and an increased efficiency of skill acquisition.

Figure 1:
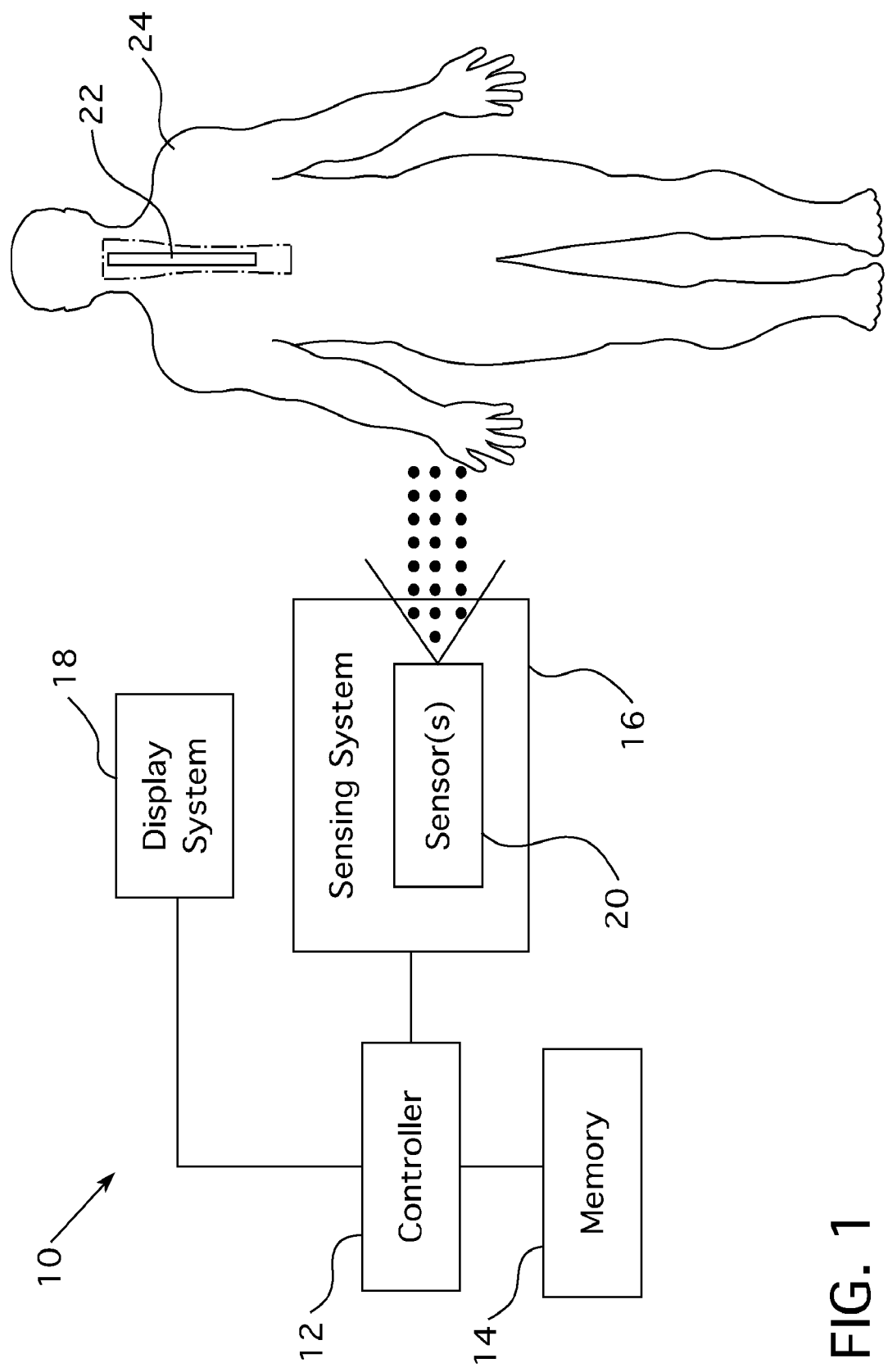
FIG. 1 is a block diagram of a training system in accordance with the present invention.

FIG. 1 is a block diagram showing a general overview of a medical procedure training system 10 in accordance with a non-limiting embodiment of the present invention. Training system 10 includes a controller 12 which may comprise a microprocessor, a microcontroller or some other suitable processing device, that is operatively coupled to a memory 14. The memory 14 can be any of a variety of types of internal and/or external storage media, such as, without limitation, RAM, ROM, EPROM(s), EEPROM(s), and the like, that provide a storage medium for data and software executable by the controller 12 for controlling the operation of other components connected thereto. As shown in FIG. 1, the controller 12 is in electronic communication with a sensing system 16 and a display system 18 in order to control and/or receive data from such components. For example, data may be transmitted from the sensing system 16 (described in greater detail below) to the controller 12 so that such data may be manipulated, logged or otherwise utilized as described elsewhere herein.

Sensing system 16 generally includes a number of sensors 20 arranged in a manner to detect the position and motion of a medical device 22 relative to a simulated body 24. Depending on the particular application, sensing system 16 may be disposed in, on or near the simulated body 22.

As previously discussed, being in electrical communication with sensing system 16, controller 12 receives information describing the position and motion of the medical device 22 within simulated body 24 from each of the number of sensors 20. Controller 12 uses such received information to generate images of an internal, or cut away view of a representation of the medical device 22 along with relevant anatomical structures that would be located near the medical device 22 if it were inserted into a living human or animal body. For example, if the medical device 22 being detected were a heart catheter detected in or near the heart of a simulated body 24, controller 12 would produce images depicting a heart catheter within an artery adjacent a heart. As another example, if the medical device 22 being detected were a Foley catheter detected in the urethra and urinary bladder of a simulated body 24, controller 12 would produce images depicting a Foley catheter moving within the urethra and into the bladder. Such images may be generated using computer graphics methods from data models of both internal anatomy and medical devices stored in memory 14 or from prerecorded images of actual medical devices taken among living, or previously living anatomy. For example, a digital video recording can be made of an actual endotracheal tube being inserted into a cadaveric human trachea, with the trachea partially cut away (resected) to show the internal passage of the tube. During a training session, the playback of such video can then be controlled by controller 12 to synchronize it with the sensed real-time position of an endotracheal tube inserted into the simulated trachea of the mannequin by the trainee. At any depth of ET tube insertion over a predetermined range, the view of the ET tube and resected trachea displayed by the controller-synchronized video can be made similar to the view the trainee would have if he or she could see directly through the body and trachea to the tube and its current placement.

After being generated by controller 12, the images are then sent to display system 18 that is adapted to display the images in a correct registration on a surface of the simulated body. Such images may be displayed in a number of ways. As will be discussed in further detail in the example provided herein, a projector system may be employed that projects the images onto a surface of the simulated body 24. Such images could also be displayed using flat or curved displays integrated on or in a surface of the simulated body 24.

Having thus described a general overview of training system 10, a more detailed description of a particular application of such a system will now be described in greater detail in conjunction with FIGS. 2 and 3 which depict an example embodiment of a training system 100 employed for teaching the medical procedure of endotracheal intubation. It is to be appreciated that the present invention may be employed for teaching a wide range of medical procedures and that such particular embodiment is provided for example purposes only and is not meant to limit the scope of the present invention.

Figure 2:
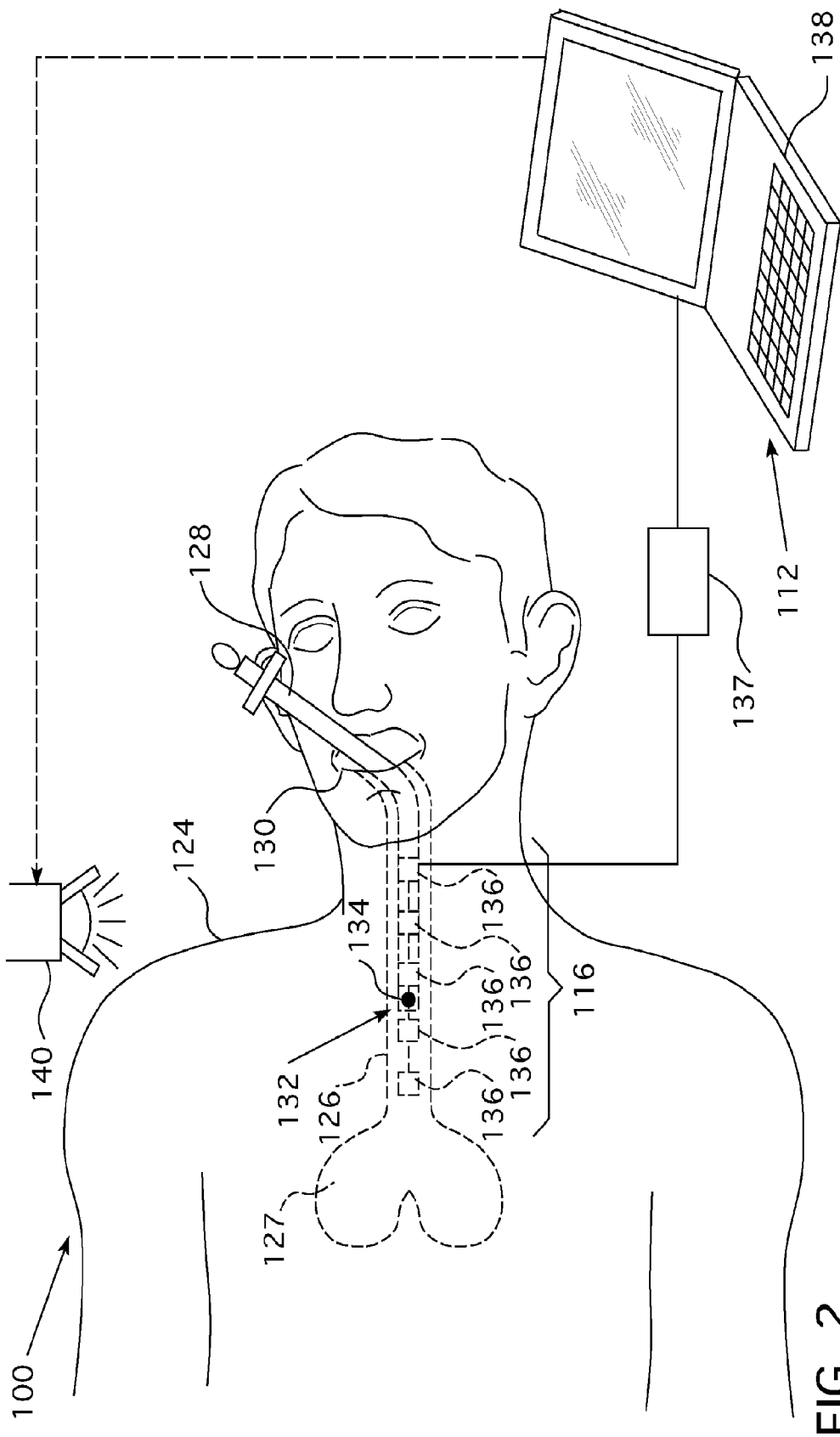
FIG. 2 is a schematic representation of a training system in accordance with an embodiment of the present invention.
Figure 3:
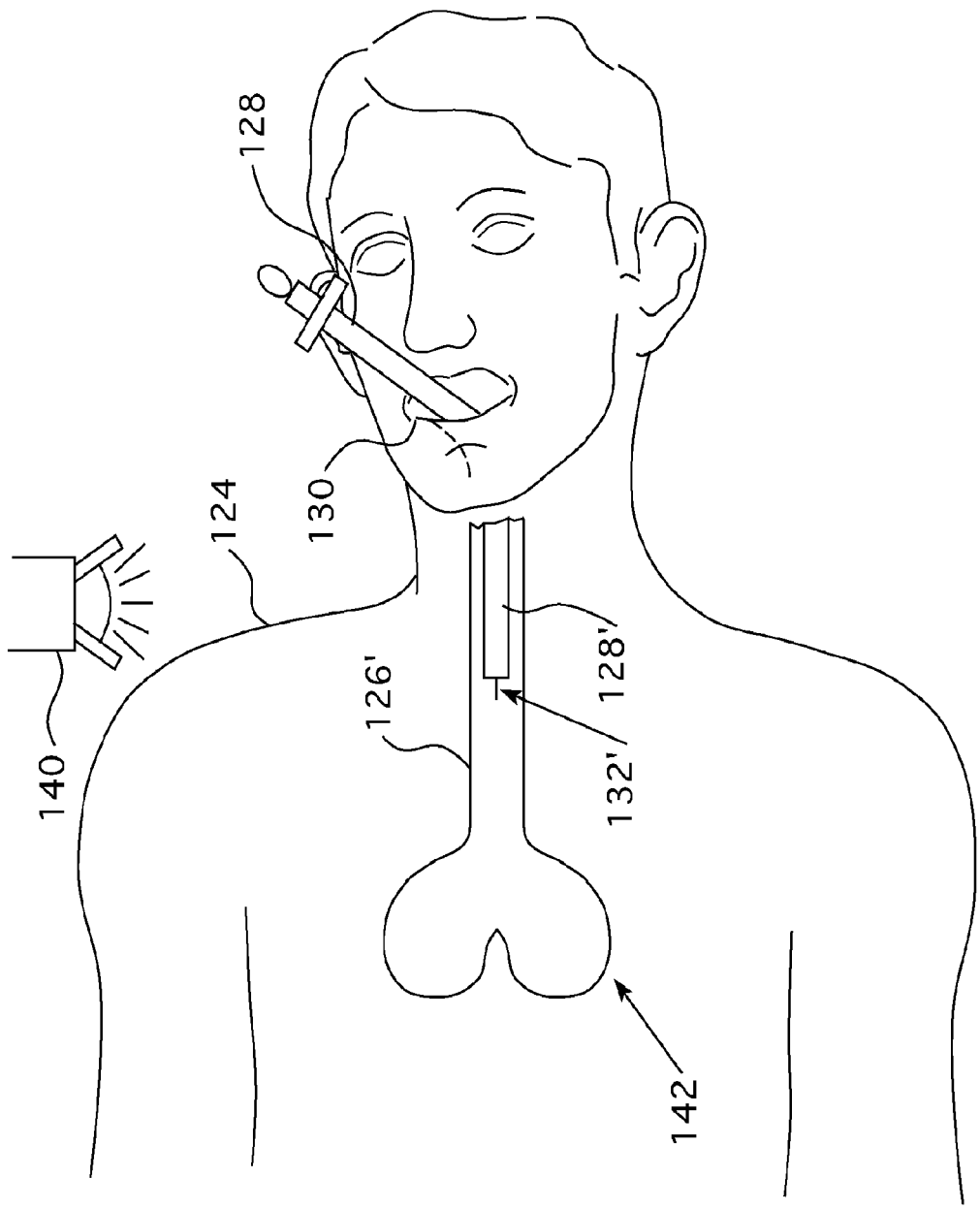
FIG. 3 is a further schematic representation of a portion of the training system of FIG. 2.

FIG. 2 generally depicts an isometric view of the torso and head of a simulated human body 124 used for medical training An example of such simulated body 124 is the SimMan® patient simulator produced by Laerdal Medical Corporation. Such simulated body 124 includes a number of anatomical features designed to closely imitate actual biologic features. As shown in hidden (dashed) line, one such feature is a trachea 126 that extends within the simulated body 124. When performing an endotracheal intubation on a patient, such as simulated body 124, a medical instrument, referred to as an intubation tube 128, is inserted through the mouth 130 and into the trachea 126. Placement of the intubation tube 128, particularly the depth of insertion of the tip 132, is critical to properly performing such procedure. For example, a common error in performing intubation is to insert the intubation tube 128 too deeply, which typically results in placement of the tip 132 of the tube in the right mainstem bronchus 127. Such errant placement results in only one lung being ventilated and protected from secretions such as blood or vomitus.

A small magnet 134 (e.g., without limitation, a neodymium magnet) is disposed at a known location along the intubation tube 128. The position and movement of such magnet 134 within trachea 126 is sensed by sensing system 116 that includes a number of Hall-effect sensors 136 disposed in an array along an outer wall (not numbered) of trachea 126. As position of the tip 132 of intubation tube 128 is of greatest concern, magnet 134 is preferably located at or about the tip 132. In a preferred embodiment, the array of hall effect sensors 136 are disposed in a flexible linear strip that may be coupled to an outer wall of a subject trachea either directly, or alternatively, through the use of an adaptor (not shown). It is to be appreciated that such construction allows for the sensor array to be readily retrofit to existing simulated bodies of varying construction and made by various companies. Additionally, it is to be appreciated that the sensing system 116 is arranged in a manner that does not affect or alter the feel of the medical procedure being performed: since there is no physical linkage between the tube and the array of sensors, no unusual mechanical forces are exerted on the tube by the sensing system, with the exception of the slight added weight of the magnet which is small in relation to the weight of the tube.

Continuing to refer to FIG. 2, each of the Hall-effect sensors 136 are in electronic communication with a data acquisition interface 137 which converts the individual sensor outputs to digital data that are then communicated to controller 112, such as a laptop computer 138 or other suitable controller device (previously discussed) that monitors the voltage output from the hall-effect sensors 136 and determines therefrom the relative position and motion of magnet 134, and thus the position and motion of tip 132 of intubation tube 128 within trachea 126. The LabVIEW program by National Instruments has been employed in such operations in an embodiment of the invention. Although shown as a separate component, it is to be appreciated that data acquisition interface 137 may be an integral part of controller 112.

Once the relative position and/or motion of the intubation tube 128 is determined, computer 138 then produces simulated images of the intubation tube 128 and relevant anatomical structures for further display to a student or students, as will be discussed further below. In the example embodiment depicted in FIGS. 2 and 3, such simulated images were produced by the following procedure: (1) A cadaveric trachea and bronchi were cut coronally. (2) The posterior half of the trachea and bronchi were affixed to a rigid foam positioning platform. The foam was previously carved to provide a form-fitting cradle for the tissue. The foam was also colored with a monochromatic green paint commonly termed chroma key paint which enabled the subsequent video separation of the supporting background from the other elements. (3) A digital video camera was mounted above the positioning platform. Position, angle, field of view and focal length were chosen so as to provide a view of the resected trachea, similar to the view a medical practitioner would have looking through a transparent body at the same structures during the performance of endotracheal intubation. (4) While the digital video camera was recording, an endotracheal tube was inserted into the superior end of the open trachea and smoothly moved inferiorly until it entered the right mainstem bronchus (this is the same path the tube would take during the real procedure). (5) The digital video was post-processed by video editing software that enabled the chroma key blue areas to be remapped to black. This provided a captured digital video clip showing an endotracheal tube moving through various known positions down the lumen of a trachea, with all other areas of the image masked out by black. Such images can then be readily correlated to the active position of the intubation tube 128 determined from sensors 136 by specifying the playback position of the video under the control of the sensed position of the intubation tube 128. As the real tube being manipulated by a student moves forward or backward within the simulated body 124, the video images are played back in a correlated way. When projected onto the surface of the simulated body directly over the simulated body's trachea (see below) the perception is created that the trainee is seeing through the surface of the body to the subjacent endotracheal tube, trachea and bronchi. In an embodiment of the invention, the LabVIEW program controls the playback of the digital video via an ActiveX interface to the Windows Media Player, with the playback position calibrated and synchronized to the measured position of the tip of the endotracheal tube.

The controller 112 then communicates the images to a display system, such as projector 140 mounted above the simulated body 124, which then produces a projected image or images 142 in a correct registration on the surface of the simulated body 124. In the example embodiment shown in FIG. 3, such projection generally includes a simulation of the trachea 126' and inserted intubation tube 128' and tip 132' projected onto the chest area of the outer surface of the simulated body 124. The projected image 142 is aligned and calibrated to the body by projecting the video image of the trachea onto the simulated body with the body's skin and intervening structures temporarily removed. The size, position and orientation of the video image are then adjusted so that the projected image 142 of the trachea precisely overlays the physical trachea 126 of the simulated body 124 (the skin and surface structures are then replaced for training sessions). Such images 142 are interactively projected in real-time so that the student or students performing and or watching the procedure can see a representation of the internal happenings and modify them, if necessary, while the procedure is being performed.

Furthermore, additional sensing systems and additional video images can be incorporated into the system so that various error states can be detected and corrective notification taken. For example, one or more additional Hall-effect sensors can be located adjacent to the esophagus of the simulator. If the endotracheal tube is incorrectly inserted into the esophagus, the variation in the signals from these Hall-effect sensors are detected and the controller 112 can immediately alert the trainee via, for example, without limitation, a visual, auditory, or tactile (e.g., without limitation, vibrotactile) alert. Furthermore, a video image of an endotracheal tube moving within an esophagus can be generated and displayed using methods as described above. In this way the trainee can receive immediate feedback on an error so that immediate analysis and corrective action can be taken.

The particular methodology described above for video image generation, real-time synchronization to sensed device position, and geometrically registered projective display onto the surface of a simulated body, can be readily applied for training other medical procedures, especially those involving primarily one-dimensional insertion of a device such as a tube or catheter. Such procedures include, but are not limited to, central line insertion, pulmonary artery catheterization and Foley catheterization of the urinary bladder.

The embodiments described and illustrated above can be further enhanced via extrapolation of the video control, synchronization and projection techniques to other variables sensed during the procedure, and other visual displays of the consequences of external actions by the trainee. For example, an additional step during endotracheal intubation is the inflation of a cuff surrounding the tube near its tip via insufflation of air from a syringe. This soft cuff expands to occupy the space between the tube and the interior wall of the trachea, providing an airtight seal that also prohibits fluids such as blood, mucous or vomitus from entering the lungs. The methodology described above could be applied to add the ability to visually display a "see-through view" of the inflation of the cuff as follows: (1) A sensor is added to the syringe to monitor either the translation of the syringe plunger (via a linear position encoder, for example) or the air pressure in the syringe, which in the steady-state is equal in value to the air pressure in the cuff. (2) A digital video or computer generated imagery (CGI) is created that visualizes an expanding cuff. This video (Video B) will be used in conjunction with the original video of the endotracheal tube, trachea and bronchi (Video A). (3) The controller 112 superimposes the video image of the cuff (Video B) onto the previous video image of the endotracheal tube, trachea and bronchi (Video A). The video image of the cuff is positioned so as to overlay the tip of the endotracheal tube in Video A. This is a straightforward video compositing task since the position of the tip of the endotracheal tube is known in each frame of Video A. (4) During the simulated intubation procedure, the sensed position of the syringe plunger (or air pressure in same) is used to control the playback of Video B. The result is the creation of a composite video image projected onto the surface of the simulated body that shows both the position of the endotracheal tube within the trachea, and the degree of inflation of the cuff. This enhances the perceived realism of the system in revealing to the trainee a view through a virtual window into the body of the behavior of multiple aspects of an internally positioned device that the trainee is manipulating externally.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A medical procedure training method, comprising:
sensing at least one of a position or motion of a medical device with respect to a simulated body or portion thereof;

generating visual images of both the medical device and relevant anatomical structures using the at least one of sensed position or motion of the medical device; and displaying the images in real-time in a correct registration on a surface of the simulated body.

2. The medical procedure training method of claim 1 further comprising:

detecting that the medical device has moved to a location that has been predetermined to be an error; and providing a notification in the form of an alert that the medical device has moved to the location predetermined to be an error, wherein the alert comprises at least one of an audible notification, a tactile notification, or a visible notification distinct from, and in addition to, the visual images of the medical device and relevant anatomical structures.

3. A medical procedure training system comprising:

at least a portion of a simulated body having a surface;

a sensing system structured to detect at least one of the position or motion of a medical device inserted into the simulated body;

a display system; and a processor structured to:
generate images of the medical device and relevant anatomical structures based on the at least one detected position or motion of the medical device,
cause the display system to display the images in a correct registration on the surface of the simulated body.

4. The training system of claim 3 wherein the sensing system is structured to detect the position and motion of a medical device inserted in a passage extending into and defined within the simulated body and wherein the sensing system comprises a number of sensors disposed along the passage.

5. The training system of claim 4 wherein each sensor of the number of sensors comprises a Hall-effect sensor.

6. The training system of claim 3 wherein the display system comprises a projector structured to project the images onto the surface of the simulated body.

7. The training system of claim 3 wherein the display system comprises a video display system disposed in or on the surface of the simulated body.

8. The training system of claim 3 wherein the processor is further structured to:
detect that the medical device has moved to a location that has been predetermined to be an error; and
provide a notification in the form of an audible notification, a tactile notification, or a visible notification distinct from, and in addition to, the images of the medical device and relevant anatomical structures that the medical device has moved to the location predetermined to be an error.

9. A training system for use with a simulated body, the system comprising:

a sensing system structured to detect at least one of the position or motion of a medical device with regard to the simulated body;

a processor structured to:
generate images of the medical device and relevant anatomical structures based on the at least one detected position or motion of the medical device,
detect that the medical device has moved to a location that has been predetermined to be an error, and
provide a notification in the form of an audible notification, a tactile notification, or a visible notification distinct from, and in addition to, the images of the medical device and relevant anatomical structures that the medical device has moved to the location predetermined to be an error; and a display system structured to display the images in a correct registration on the outer surface of the simulated body.

10. The training system of claim 9 wherein the sensing system is structured to be disposed within the simulated body.

11. The training system of claim 9 wherein the sensing system comprises an array of sensors structured to be disposed within the simulated body.

12. The training system of claim 11 wherein each sensor of the array of sensors comprises a Hall-effect sensor.

13. The training system of claim 11 wherein the sensing system further comprises an adaptor that is structured to couple the array of sensors to an internal structure of the simulated body.

14. A training system for use with a simulated body, the system comprising:

a medical device;

a sensing system structured to detect at least one of the position or motion of the medical device with respect to the simulated body;

a processor structured to:
generate images of the medical device and relevant anatomical structures based on the at least one detected position or motion of the medical device,
detect that the medical device has moved to a location that has been predetermined to be an error, and
provide a notification in the form of an audible notification, a tactile notification, or a visible notification distinct from, and in addition to, the images of the medical device and relevant anatomical structures that the medical device has moved to the location predetermined to be an error; and a display system structured to display the images in a correct registration on the outer surface of the simulated body.

15. The training system of claim 14 wherein the medical device comprises a magnet coupled thereto and the sensing system comprises an array of Hall-effect sensors structured to be disposed along a passage within the simulated body for detecting position of the magnet therein.

* * * * *